(12) United States Patent
Chaudhry et al.

(10) Patent No.: US 10,187,395 B2
(45) Date of Patent: Jan. 22, 2019

(54) RESOURCE SHARING AND DESIGNATION OF PERMISSIONS FOR OTHER TENANTS AND UNREGISTERED USERS OF SAME TENANT

(71) Applicant: Microsoft Technology Licensing, LLC, Redmond, WA (US)

(72) Inventors: Anjli Chaudhry, Seattle, WA (US); William Hong Vong, Hunts Point, WA (US); Ryan A. Jansen, Kirkland, WA (US); Samuel Lenz Banina, Bellevue, WA (US); Jose Miguel Arreola Gutierrez, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/283,174

(22) Filed: Sep. 30, 2016

(65) Prior Publication Data
US 2017/0318021 A1    Nov. 2, 2017

Related U.S. Application Data

(60) Provisional application No. 62/329,092, filed on Apr. 28, 2016.

(51) Int. Cl.
| | | |
|---|---|---|
| H04L 29/06 | (2006.01) | |
| G06F 17/30 | (2006.01) | |
| G06Q 10/10 | (2012.01) | |
| G06F 9/451 | (2018.01) | |
| G06F 3/0482 | (2013.01) | |

(52) U.S. Cl.
CPC ............ *H04L 63/102* (2013.01); *G06F 9/453* (2018.02); *G06F 17/3064* (2013.01); *G06F 17/30991* (2013.01); *G06Q 10/10* (2013.01); *G06F 3/0482* (2013.01)

(58) Field of Classification Search
CPC .... G06F 9/453; G06F 3/0482; G06F 17/3064; G06F 17/30991; G06Q 10/10; H04L 63/102
See application file for complete search history.

(56) References Cited

U.S. PATENT DOCUMENTS

| | | | |
|---|---|---|---|
| 7,877,693 | B2 | 1/2011 | Baek et al. |
| 8,195,743 | B2 | 6/2012 | Janedittakarn et al. |

(Continued)

OTHER PUBLICATIONS

"Share an app", Retrieved on: Apr. 18, 2016 Available at: https://powerapps.microsoft.com/en-us/tutorials/share-app/.

(Continued)

*Primary Examiner* — Baotran N To
(74) *Attorney, Agent, or Firm* — Workman Nydegger

(57) ABSTRACT

Autocompleting into an invite box for purposes of sharing an executable computing resource such as an application or portion thereof. However, the autocomplete is populated with potential sharees of multiple tenants or with identities that are not registered with the tenant directory of the user. Thus, potentially any potentially sharee worldwide may be populated within the list of potential sharees. As the desired potential sharee comes into view, that potential sharee may be selected, and added to a list of one or more selected sharees. At some point, a control may be selected to allow the executable computing resource to be shared with the selected sharees within the list.

20 Claims, 4 Drawing Sheets

(56) References Cited

U.S. PATENT DOCUMENTS

| | | | |
|---|---|---|---|
| 8,626,865 B1 | 1/2014 | Phillips et al. | |
| 2005/0246636 A1* | 11/2005 | Blagsvedt | G06Q 10/10 715/700 |
| 2007/0288850 A1 | 12/2007 | Fletcher | |
| 2008/0222256 A1 | 9/2008 | Rosenberg et al. | |
| 2009/0234876 A1* | 9/2009 | Schigel | G06F 17/30873 |
| 2012/0011518 A1 | 1/2012 | Duan et al. | |
| 2012/0109836 A1 | 5/2012 | Chen et al. | |
| 2015/0180980 A1* | 6/2015 | Welinder | H04L 65/403 715/758 |

OTHER PUBLICATIONS

Chandra, Ravi, "PowerApps—Microsoft's new Beast", Published on: Mar. 29, 2016 Available at: http://www.netwoven.com/2016/03/powerapps-microsofts-new-beast/.

"Innovators everywhere", Retrieved on: Apr. 18, 2016 Available at: https://powerapps.microsoft.com/en-us/.

"Help center", Retrieved on: Apr. 18, 2016 Available at: https://powerapps.microsoft.com/en-us/support/.

Levesque, Jon, "Welcome to Microsoft PowerApps!", Published on: Nov. 30, 2015 Available at: https://social.technet.microsoft.com/Forums/en-US/14cc68e9-7663-4611-a442-ba8d9d8834cb/welcome-to-microsoft-powerapps?forum=projectsiena.

"Central Desktop's Social Technology Platform Joins the Intuit App Center", Published on: Oct. 19, 2009 Available at: https://www.centraldesktop.com/press-releases?p=intuit-small-business-collaboration&id=1.

Krebs, et al., "Architectural Concerns in Multi-Tenant SaaS Applications", In Proceedings of the 2nd International Conference on Cloud Computing and Services Science, Apr. 18, 2012, 6 pages.

Aulbach, Stefan, "Schema Flexibility and Data Sharing in Multi-Tenant Databases", In Doctoral Dissertation of University of Munich, Retrieved on: Apr. 18, 2016, 146 pages.

"SkyGiraffe", Retrieved on: Apr. 18, 2016 Available at: http://skygiraffe.com/.

"Who will lead the next app revolution?", Retrieved on: Apr. 18, 2016 Available at: http://www.salesforce.com/platform/overview/.

"International Search Report and the Written Opinion" issued in PCT Application No. PCT/US2017/029523 dated Aug. 2, 2017.

* cited by examiner

RESOURCE SHARING AND DESIGNATION OF PERMISSIONS FOR OTHER TENANTS AND UNREGISTERED USERS OF SAME TENANT

CROSS-REFERENCE TO RELATED APPLICATION

This application claims the benefit of U.S. Provisional Patent Application Ser. No. 62/329,092, filed Apr. 28, 2016, which provisional patent application is incorporated herein by reference in its entirety.

BACKGROUND

Computing resources come in a variety of forms. For instance, a computing resource might include software resources, such as data or programs. Computing resources might also include hardware resources, such a processing resources, storage space, communication channel I/O, or the like. When sharing resources, the user that is to share an application identifies the user (also called herein an "intended sharee") to share the resource with.

As an example, the user that first runs an application may be regarded as the owner of that application, having rights to share an application or keep access to the application to just the owner. If the owner chooses to share an application with another user, the owner somehow identifies an intended sharee to share the application with. This sharing may be with certain permissions given to the intended sharee. Such permissions might be default permissions, or might be specified by the owner.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to allowing a user experience in which a user may quickly and intuitively identify a user (an "intended sharee") to share resources with. The user experience may also allow a user to designate permissions for accessing the shared resource for one or more potential sharees. The user experience further allows each sharee to quickly identify the owner of the application. A user might gain quick access to the identity of potential sharees even across trust boundaries—such as between tenants in a public cloud computing environment. In the context of a cloud computing environment, a "tenant" is an entity (such as an organization) that orders resources in the cloud computing environment and that owns data that in the cloud computing environment that, for some or all of that data, is to be isolated for access only by that entity or with permission from that entity.

An example of a trust boundary would be perhaps a boundary between two companies. Typically, a tenant has its own directory of registered users. The principles describe herein allow one user to share resources and/or designate permissions to access such resources by providing a facility to quickly identify an intended sharee, even if that intended sharee does not yet exist in the same directory (in the same trust boundary or tenant), and even if that intended sharee exists in some other directory (outside of the same trust boundary or tenant).

This quick identification occurs via the use of an auto-complete that begins to fill in possible user identifications upon the user typing a few characters of the intended sharee's identification. As the user types in more characters, the possible sharee identifications are further and further narrowed, until the intended sharee is within the autocomplete list. Then the user might either complete typing in the intended sharee identification, or select the intended sharee from the autocomplete list. Autocomplete itself is not a new technology. It currently exists to auto-populate recently used e-mail addresses in many e-mail programs. Accordingly, mental muscle memory is already built in for most users such that the user can quickly use autocomplete methods to identify intended sharees of an application.

However, in accordance with the principles described herein, autocomplete occur across multiple tenants, and even for unregistered users in a tenant directory, and need not rely on recently used lists. In the case of unregistered users, perhaps a globally recognized identifier (such as an e-mail address) may be used. This autocomplete helps the user from mistyping user identifiers and/or email addresses of intended sharees, which is particularly likely if selecting from a larger number of potential sharees.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
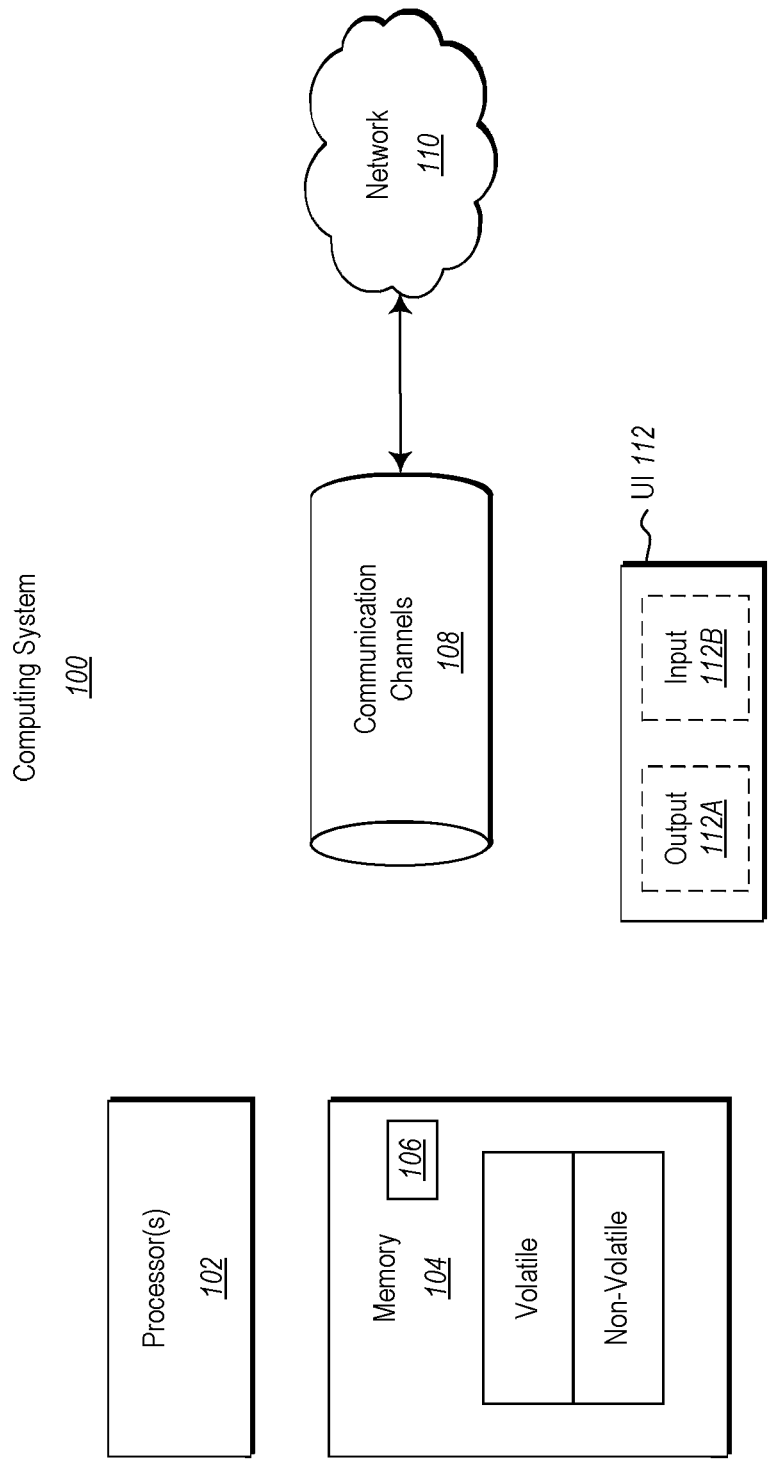
FIG. 1 illustrates a computing system in which the principles described herein may operate, and which includes output mechanisms that include a display upon which the user interfaces of FIGS. 2 and 3 may be displayed.

At least some embodiments described herein relate to allowing a user experience in which a user may quickly and intuitively identify a user (an "intended sharee") to share resources with. The user experience may also allow a user to designate permissions for accessing the shared resource for one or more potential sharees. The user experience further allows each sharee to quickly identify the owner of the application. A user might gain quick access to the identity of potential sharees even across trust boundaries—such as between tenants in a public cloud computing environment. In the context of a cloud computing environment, a "tenant" is an entity (such as an organization) that orders resources in the cloud computing environment and that owns data that in the cloud computing environment that, for some or all of that data, is to be isolated for access only by that entity or with permission from that entity.

An example of a trust boundary would be perhaps a boundary between two companies. Typically, a tenant has its own directory of registered users. The principles describe herein allow one user to share resources and/or designate permissions to access such resources by providing a facility to quickly identify an intended sharee, even if that intended sharee does not yet exist in the same directory (in the same trust boundary or tenant), and even if that intended sharee exists in some other directory (outside of the same trust boundary or tenant).

This quick identification occurs via the use of an autocomplete that begins to fill in possible user identifications upon the user typing a few characters of the intended sharee's identification. As the user types in more characters, the possible sharee identifications are further and further narrowed, until the intended sharee is within the autocomplete list. Then the user might either complete typing in the intended sharee identification, or select the intended sharee from the autocomplete list. Autocomplete itself is not a new technology. It currently exists to auto-populate recently used e-mail addresses in many e-mail programs. Accordingly, mental muscle memory is already built in for most users such that the user can quickly use autocomplete methods to identify intended sharees of an application.

However, in accordance with the principles described herein, autocomplete occur across multiple tenants, and even for unregistered users in a tenant directory, and need not rely on recently used lists. In the case of unregistered users, perhaps a globally recognized identifier (such as an e-mail address) may be used. This autocomplete helps the user from mistyping user identifiers and/or email addresses of intended sharees, which is particularly likely if selecting from a larger number of potential sharees.

The principles described herein may apply in embodiments in which an application may be freely shared globally with any user. However, because most applications have some sensitivity to who the owner wishes to access the application (or who should access the application), some restrictions may be imposed on the possible set of potential sharees. For instance, in some embodiments, any users within a consumer domain may be eliminated since resources may not be shared with them. In some user experiences, everyone who has access to the application can easily locate the owner, other editors and readers of the application, because the list of the users that have access to the application are ordered by the amount of privilege the users have on the application.

Some introductory discussion of a computing system will be described with respect to FIG. 1. Then, the principles described herein will be described with respect to subsequent figures. Some introductory discussion of a computing system will be described with respect to FIG. 1. Then, the mechanism and methods that enable efficient sharing of resources over a network will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "virtual machine", "scheduler", "manager", "module", "compiler", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality objects, and so forth. Examples of input mechanisms 112B might include, for instance, microphones, touchscreens, holograms, cameras, keyboards, accelerometers, levers, pedals, buttons, knobs, mouse of other pointer input, sensors of any type, virtual reality objects, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
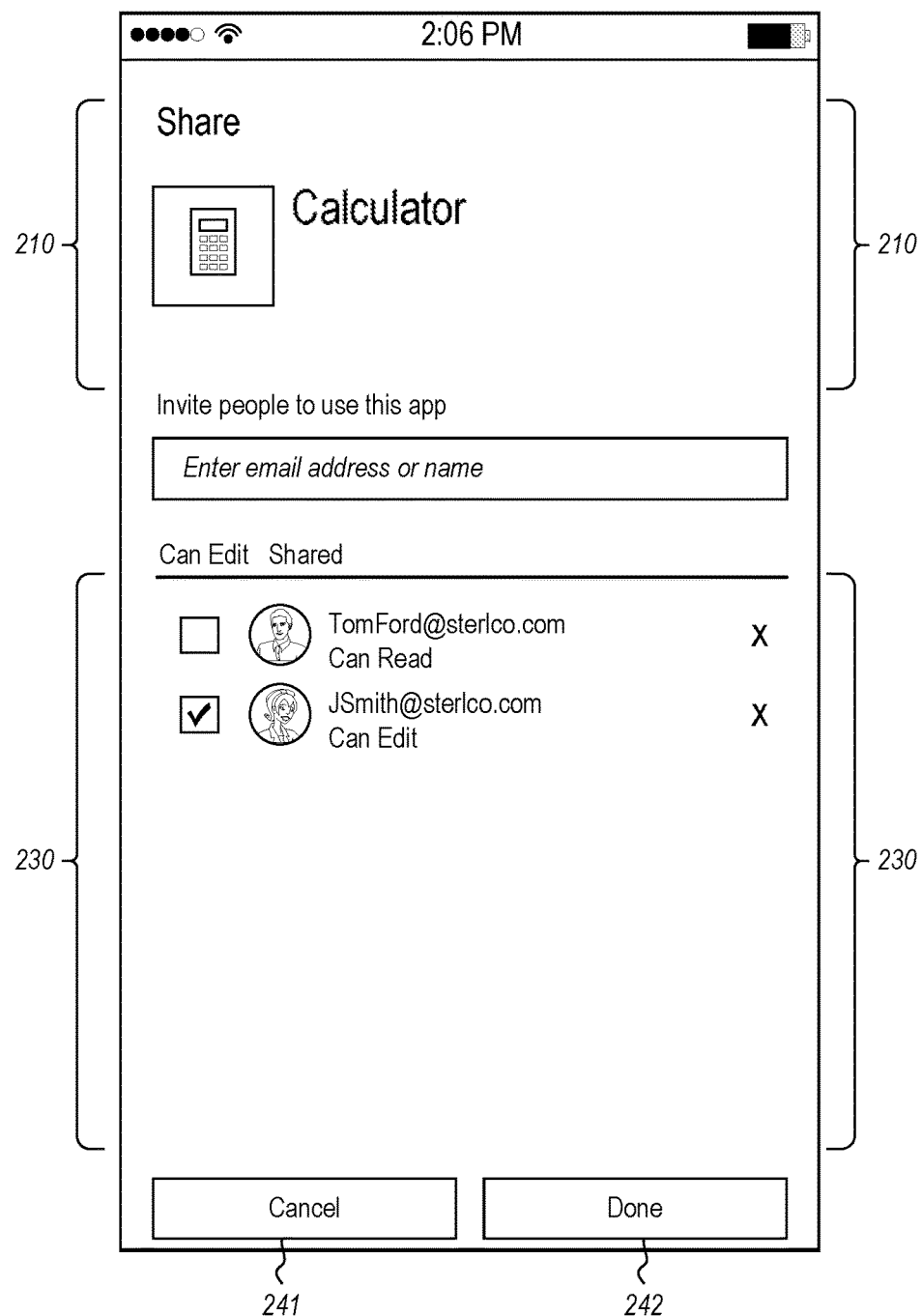
FIG. 2 illustrates a user interface that might be displayed to a user (e.g., a sharer) of an executable computing resource that wishes to share the executable computing resource with another user (e.g., a sharee)
Figure 3:
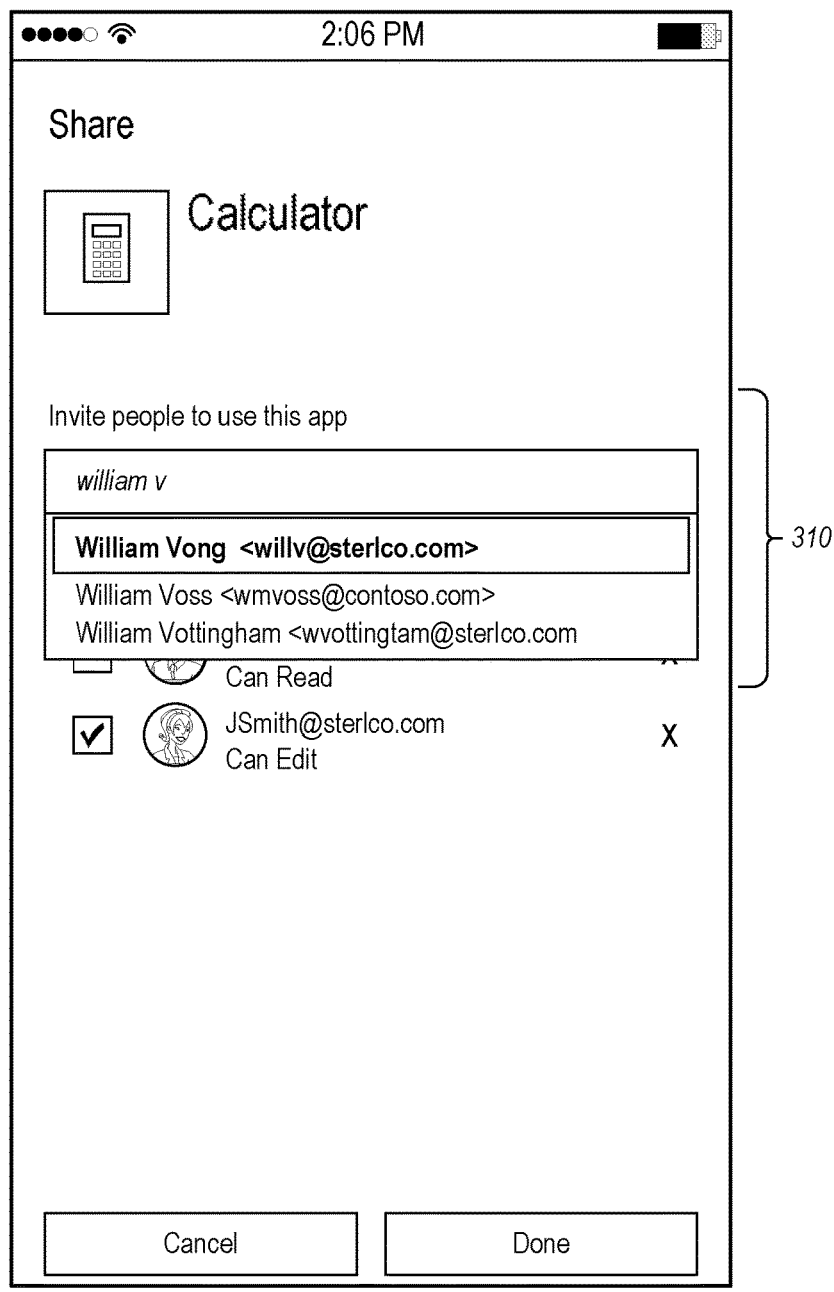
FIG. 3 illustrates a user interface state that shows a subsequent state of the user interface of FIG. 2 in which the sharer has now entered the first several characters of an intended sharee in the invite box.

Having described a general computing system with respect to FIG. 1, an example user experience and scenario enabled by the principles described herein will be outlined with respect to FIGS. 2 and 3. Thereafter, the operation of the principles described herein will be described with respect to FIG. 4.

FIG. 2 illustrates a user interface 200 that might be displayed to a user (e.g., a sharer) of an executable computing resource that wishes to share the executable computing resource with another user (e.g., a sharee). In this example, the executable computing resource is an application. For instance, the application is a calculator. However, the executable computing resource may be any computing resource (e.g., a file, set of executable instructions, and so forth) that may be executed by a computer to perform one or more actions. Even an application portion, such as a module, component, object method, widget, or the like, may be an executable computing resource that may be shared consistent with the principles described herein. The upper portion 210 of the user interface 210 thus identifies one or more applications that are intended for possible sharing. In this case, there is but one executable computing resource (the calculator application) that is selected for sharing. In the remainder of this description, an "application" will be used as an example of an executable computing resource. Accordingly, wherever an "application" is introduced below, it will be understood that the same thing that is described with respect to that application would apply equally to any executable computing resource.

The sharing user (i.e., the sharer) could share the executable computing resource in a default or initial state. For instance, the calculator could be shared in an initial state with no calculation or values already entered into the calculator, and/or with a mode of the calculator (e.g., standard, scientific, etc.). On the other hand, there sharer could share the executable computing resource in a state in which the sharer has already interfaced with the executable computing resource. For instance, the sharer might already have entered calculations into the calculator and already received results. Users that are shared the executable computing resource would potentially (e.g., by default or with permission) then first access the executable computing resource in that state. For instance, a human resource representative might use the calculator to show an employee how their deductions were taken out of their paycheck, so the user can actually see how the calculations were made.

When sharing the application, the application may be shared for use by another entity, but also the state of the application may be shared. For instance, perhaps a traveler wishes to share a calculation of reimbursement receipts with an assistant so that the assistant can check the calculations against the receipts submitted. Alternatively, perhaps one party in a negotiation wishes to share with the other party how she arrived at a proposed figure in an attempt to persuade as to the fairness of an offer.

For instance, permissions might including read permissions that give the sharee a right to see the application execute and access the resulting data. The permissions might also include edit permissions, which may allow the sharee to change the application. For instance, the sharee might change inputs to the application. If it is still authoring time of the application, perhaps the sharee with edit permissions may even change the application itself, or change permissions for other sharees. The permissions might also include share permissions that allow the sharee to likewise share the application with yet other users (e.g., second-tier intended shares). There may, in fact, be numerous instances of sharing, and numerous tiers of sharing.

In some cases, the right to edit an application implicitly includes the right to share the application though such permissions might also be separately specified and defined. Furthermore, the right to set permissions of other users to access resources may be reserved to the owner of the application, or perhaps may be endowed to all sharees with edit permissions on the resource, or perhaps only given to those with share permissions on the resource.

The middle to bottom portion 230 of the user interface of FIG. 1 shows a list of sharees who already have some kind of access to the application. The listed users are strictly fictional. In this case, there are two other sharees including a user having e-mail address TomFord@sterlco.com (hereinafter referred to as "Sharee 1") and a user having an e-mail address JSmith@sterlco.com (hereinafter referred to as "Sharee 2").

A sharer with edit permission might also update or delete permissions of the users that the resource has already been shared with. Here, perhaps a minimum of a read permission is granted to each of the sharees. If edit permission is to be granted, then the user might also click the check box control (shown under the header "Can edit"). For instance, Sharee 2 has edit permissions since the left check box control is checked. In this case, perhaps share permissions are granted to anyone with edit permissions. However, if share permissions were distinct from edit permissions, another check box control might appear under a column perhaps entitled "Can share", which could appear right next to the "Can edit" check box control. An "x" appears to the right of each sharee allowing the owner to delete a sharee from the list of sharees. Although not shown, other permissions may also be designed via an appropriate control—such as a dedicated checkbox for each permission, or via a dropdown menu.

A sharer may add new sharees, as described further herein below, by using the invite box 220 (which when empty includes the italicized text "Enter email address or name"). The changes to the sharee list and access permissions that are made during a particular session are not committed to the backend service unless the owner clicks a particular control (e.g., a "Done" control 242) to commit all the changes made since the beginning of the session. In some embodiments, Clicking on the "Cancel" control 241 discards all of the changes that have been made in the user interface in that session. For instance, a session may begin when the user first selects an application for sharing thereby initiating display of the sharing user interface just described.

The user interface of FIG. 2 has been described as being displayed and edited by a sharer of an application. The original sharer might be considered the "owner" of the application as that sharer started the sharing operations. A similar user interface may also be made available to each sharee of the application. A user with read permissions only might not be provided with the invite box (if the tenant policy indicates that a person with read permissions is not permitted to invite), or the invite box would be disabled (because they cannot share with new sharees). Also, if the tenant policy so indicates, a user with read permissions only would not have any check box controls next to any of the sharees listed in the sharees list, or such check boxes would be disabled (because such a user cannot change permissions). However, a user with read permissions only might still be provided with a list of sharees, and an indication of the corresponding sharees permissions. For instance, Sharee 1 would still be annotated with "Can read", and share 2 would still be annotated with "Can edit".

The user interface of FIG. 1 may also be presented to a user that has edit and share permissions. In fact, the list of sharees may also be partially populated by the owner or a prior sharee prior to the current sharee having access to the user interface. For instance, in FIG. 1, perhaps the user viewing FIG. 1 is actually Sharee 2, and thus Sharee 2 sees she is in the sharee list and what her permissions are. In some embodiments, the sharee list may be headed by an identification of an owner. For instance, the owner might be annotated with the word "Owner" where permissions are normally annotated.

FIG. 3 illustrates a user interface state 300 that shows a subsequent state of the user interface 200 of FIG. 2 in which the sharer has now entered the first several characters of an intended sharee in the invite box. In this case, the user has entered "William V". An autocomplete dropdown control 310 is shown and updated as each character is entered. Note that the autocomplete dropdown control includes users having e-mails for different domains (including "sterlco.com", and "contoso.com"—which are strictly fictional domains for illustrative purposes only). Perhaps these two companies are engaged in negotiations involving intensive calculations, and the calculator is being shared as a tool of persuasion. The data is being pulled from multiple directories, or from a globalized directory—such as a cloud directory service (an example for the WINDOWS® AZURE™ cloud being AZURE™ ACTIVE DIRECTORY®). However, other public cloud offerings also have cloud directory services, and the principles described herein are not limited to any particular public cloud.

In the embodiment illustrated with respect to FIGS. 2 and 3, the logic supporting the invite box looks at the text and determines what schema the text might be following. For instance, the schema might be a universally recognized identification schema such as an actual e-mail address or perhaps an entry in a tenant directory. As more text is entered, the logic might narrow down on what the intended schema might be. For instance, upon encountering an "@" symbol, the logic might determine that the schema is an e-mail address. Upon encountering a symbol that is not legal for one or more of the schemas (e.g., a space), the logic might eliminate those schemas as possible sources of interpretation of the text.

As illustrated in FIG. 3, three possible autocomplete sharee identities are listed (e.g., William Vong <willv@sterlco.com>, William Voss <smvoss@contoso.com>, and William Vottingham <wvottingtam@sterlco.com>). The user may, at any point, select one of these potential sharees, and they will then be added to the sharee list. Subsequently, the user may then edit permissions of that sharee. Again, the changes may be committed to the back end service by selecting the "Done" control, or undone by selecting the "Cancel" control. Note in the list 310 that there are directory entries coming from two tenants—one for sterlco.com and one for contoso.com. Thus, the potential sharees come from a multi-tenant database.

The possible sharees list may be quite enormous, because in theory, in a purely public application involving no sensitivity, the application may be shared with anyone in the world. In the autocomplete context, this presents a problem because even if numerous characters of the sharee identity are names, there might still be insufficient characterizes to reduce the set of possible sharees to a manageable number likely to include the intended sharee. Accordingly, in accordance with the principles described herein, intelligent presentation and sorting of possible sharees in the autocomplete list is facilitated.

For instance, the ordering of sharees may be a function involving one or more of the following parameters: whether the potential sharee is a recently used user identity for this application, whether the potential sharee is a recently used user identity for a group of applications in the aggregate, whether the potential sharee is a frequently used user identity for this application, whether the potential sharee is a frequently used user identity for a group of applications in the aggregate, a time since the user identity was last used for the shared application, a time since the user identity was used in an aggregation of applications, whether the user identity is in a contacts list specific to the sharer, whether the user identity is associated with a set of one or more predetermined domains or domain names, and historical analysis of user behavior in selecting intended sharees, and so forth). Thus, even if the potential list of sharees is large, the intended sharee is more likely to more quickly pop up near the top of the autocomplete list sooner in the typing operation.

If a user decides to ignore the autocomplete options and completes the user identifier (e.g., the e-mail) in full, the result of the e-mail address might go into the user's autocomplete suggestions from that point on. Autocomplete suggestions that are added based on the user completely typing in the e-mail address might also be given priority to be shown closer to the top of the autocomplete list.

When sharing with unregistered users using, for instance, an e-mail address, a record is created in our storage with the email and the permission. Note that the same email address can have permission under multiple applications. The management logic also handles giving the unregistered user (e.g., the e-mail address), the maximum permission may be assigned to a specific application, so, in case that the same application is shared with the same user multiple times, the maximum permission assigned. In operation, an e-mail is sent to the e-mail address associated with the unregistered user with information about the application that was shared. Then, after the user registers and calls the services with that e-mail address, the permissions are redeemed, and the user can start using the shared applications. All this is transparent for the user, the user does not even see delays on the process.

As an example, suppose that the registration for a tenant is via the AZURE ACTIVE DIRECTORY. For instance, the tenant is a company (given a tenant ID) and the user of a tenant (person's email) is given an object ID. If user A with an object ID invites user without an object ID. The Portal invites user B and then sets up the permissions for user B and then gives him an object ID for the specific email address of the tenant. So, when the user B accesses the shared application, the user is authenticated and given the latest set or strongest level (e.g., read or write) of permissions. Thus, the system can temporarily delegate permissions to a person (or email) that is outside the directory but inside the tenant. If there are more than one permission (or ticket), when the new user signs on, the new user can claim all the "pending tickets" that are given to him (i.e., this is called cascading permissions).

The user interfaces, and underlying components in support of rendering the user interface, may be offered by a computing system. Accordingly, to support the principles described herein, a discussion of a computing system will now be described. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses).

Figure 4:
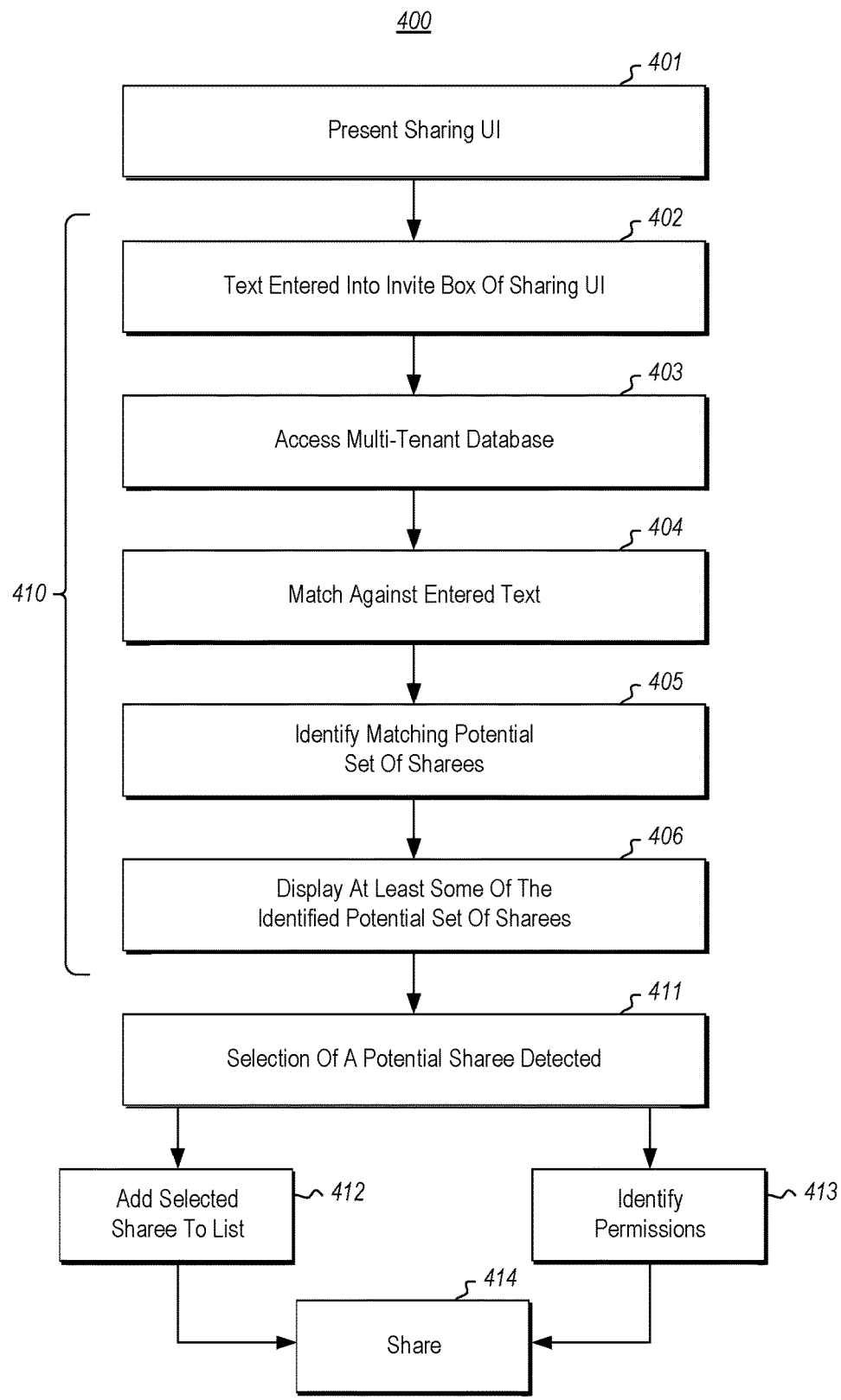
FIG. 4 illustrates a flowchart of a method for sharing an executable computing resource in accordance with the principles described herein.

FIG. 4 illustrates a flowchart of a method 400 for sharing an executable computing resource in accordance with the principles described herein. The method 400 includes presenting (act 401) a user interface for sharing an application with one or more sharees, the user interface including an invite box. For instance, the user interface of FIG. 2 might be presented on a display that is included as one of the output mechanisms 112A of the computing system 100.

The acts 402 through 406 are then performed (as contained within brackets 410) potentially up to each time a user enters any text within the invite box (act 402), resulting in the displayed potential sharee list being updated (act 405). In particular, in response to detection of user entry of text within the invite box (act 402), identities from a multi-tenant database of user identities are accessed (act 403) for matching against the text entered into the invite box (act 404) to thereby identify a set of potential sharees (act 405). At least a portion of the potential sharee set is then displayed (act 406). For instance, in FIG. 3, there are three potential sharees displayed in the drop down menu, each being selectable to add the potential sharee to a selected sharee list.

Upon detection detecting selection of one or more of the potential sharees (act 411), the selected potential sharee is added to a list of one or more selected potential sharees (act 412). In addition, a sharing permission is, at some point, determined for that selected sharee (act 413). The executable resource is then shared (act 414) with the individuals in the selected sharee list. For instance, in FIG. 3, upon selecting the "done" control 242, the executable resource is shared with the selected permissions with the selected sharees.

In summary, the principles described herein feature a convenient user experience that allows users to share applications with others, and designate permissions with respect to those sharees. The sharees may be designated even if they are not registered within a tenant directory, and even if the sharee belongs to another tenants.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more hardware processors; and
   a computer-readable hardware storage device having stored thereon computer-executable instructions that are executable by the one or more hardware processors to cause the computing system to present a user interface for sharing an executable computing resource with one or more sharees, the user interface including an invite box in which a user enters at least a portion of user identifiers of potential sharees of the executable computing resource, and to cause the computing system to respond to entry of text into the invite box by performing a method comprising:
   an act of accessing identifiers from a multi-tenant database of user identifiers;
   an act of matching the accessed identifiers against the text entered into the invite box to identify a set of potential sharees;
   an act of displaying at least a portion of the set of potential sharees in a sharee select control that is visually associated with the invite box and that allows the user to select one or more potential sharees from the set of potential sharees;
   upon selection of a potential sharee from the sharee select control, an act of adding the selected potential sharee to a list of one or more selected sharees; and
   an act of sharing the executable computing resource, wherein the executable computing resource is shared in a state in which input has already been entered into the executable computing resource such that the input is included with the executable computing resource during the sharing.

2. The computing system in accordance with claim 1, the method being performed in response to each of multiple incremental entries of portions of the text into the invite box thereby narrowing the identified set of potential sharees.

3. The computing system in accordance with claim 1, the act of matching the accessed identifiers against the text comprising an act of identifying an expected schema of the text being entered in the invite box.

4. The computing system in accordance with claim 3, the expected schema changing as more of the text is entered.

5. The computing system in accordance with claim 3, the expected schema including universal identification schema.

6. The computing system in accordance with claim 3, the expected schema including an e-mail schema.

7. The computing system in accordance with claim 1, the executable computing resource comprising an application.

8. The computing system in accordance with claim 1, the executable computing resource comprising a portion of an application.

9. The computing system in accordance with claim 1, the method further comprising:
   an act of sharing the executable computing resource with the one or more selected sharees on the list.

10. The computing system in accordance with claim 1, the method further comprising:
    an act of determining a sharing permission associated with at least one of the one or more selected sharees on the list.

11. The computing system in accordance with claim 10, the method further comprising:
    an act of sharing the executable computing resource with the one or more selected sharees on the list in a manner that the at least one of the one or more selected sharees has the determined sharing permission.

12. The computing system in accordance with claim 10, wherein a selected sharee has a sharing permission that allows the selected sharee to share the executable computing resource with yet one or more other sharees.

13. The computing system in accordance with claim 10, wherein the sharing permission is selected from amongst a plurality of possible sharing permissions.

14. The computing system in accordance with claim 13, wherein one of the plurality of possible sharing permissions is a default sharing permission.

15. The computing system in accordance with claim 13, wherein one of the plurality of possible sharing permissions is a default sharing permission given one or more conditions applicable to one or more of the at least one of the one or more selected sharees on the list.

16. A method comprising:
an act of presenting a user interface for sharing an application with one or more sharees, the user interface including an invite box;
an act of detecting user entry of text within the invite box;
in response to detecting the user entry of the text within the invite box, an act of accessing identities from a multi-tenant database of user identities;
an act of matching the accessed identities against the text entered into the invite box to identify a set of potential sharees;
an act of displaying at least a portion of the set of potential sharees in a sharee select control that is visually associated with the invite box and that allows a user to select one or more potential sharees from the set of potential sharees;
upon selection of a potential sharee from the sharee select control, an act of adding the selected potential sharee to a list of one or more selected potential sharees; and
an act of sharing the executable computing resource, wherein the executable computing resource is shared in a state in which input has already been entered into the executable computing resource such that the input is included with the executable computing resource during the sharing.

17. The method in accordance with claim 16, the displayed portion of the set of potential sharees also includes a potential sharee that is not in a tenant directory of any tenants of the multi-tenant database.

18. The method in accordance with claim 17, the act of accessing identities also comprising accessing a directory of potential sharees that are not in the multi-tenant database.

19. The method in accordance with claim 17, wherein a temporary entry is made in the tenant directory in order to facilitate sharing of the executable computing resource with the potential sharee that is not in the tenant directory of any of the tenants of the multi-tenant database.

20. A computer-readable hardware storage device having stored thereon computer-executable instructions that are executable by one or more hardware processors of a computing system to cause the computing system to perform a method comprising:
an act of presenting a user interface for sharing an application with one or more sharees, the user interface including an invite box;
an act of detecting user entry of text within the invite box;
in response to detecting the user entry of the text within the invite box, an act of accessing identities from a multi-tenant database of user identities;
an act of matching the accessed identities against the text entered into the invite box to identify a set of potential sharees;
an act of displaying at least a portion of the set of potential sharees in a sharee select control that is visually associated with the invite box and that allows a user to select one or more potential sharees from the set of potential sharees;
upon selection of a potential sharee from the sharee select control, an act of adding the selected potential sharee to a list of one or more selected potential sharees and
an act of sharing the executable computing resource, wherein the executable computing resource is shared in a state in which input has already been entered into the executable computing resource such that the input is included with the executable computing resource during the sharing.

* * * * *